Aug. 20, 1957 W. G. GIBSON 2,803,697

COLOR TELEVISION

Filed Dec. 10, 1953 3 Sheets-Sheet 1

INVENTOR.
WALTER G. GIBSON
BY [signature]
ATTORNEY

Aug. 20, 1957 W. G. GIBSON 2,803,697

COLOR TELEVISION

Filed Dec. 10, 1953 3 Sheets-Sheet 2

INVENTOR.
WALTER G. GIBSON
BY
[signature]

INVENTOR.
WALTER G. GIBSON
BY
[signature]

United States Patent Office 2,803,697

Patented Aug. 20, 1957

2,803,697

COLOR TELEVISION

Walter G. Gibson, Princeton, N. J., assignor to Radio Corporation of America, a corporation of Delaware Application December 10, 1953, Serial No. 397,409

9 Claims. (Cl. 178—5.4)

Figure 1:
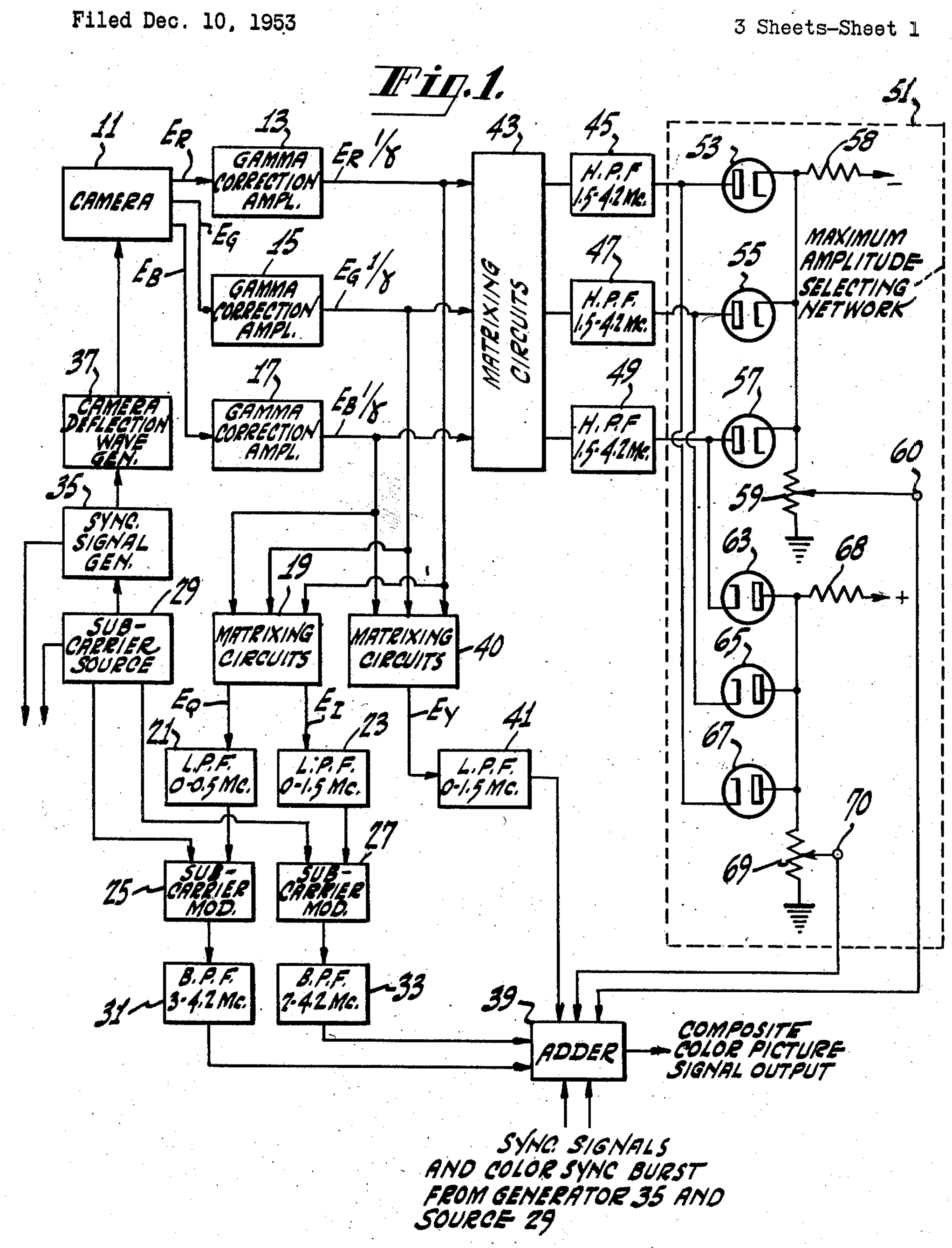

The present invention relates to color television systems of the simultaneous subcarrier type, and more particularly to methods and apparatus for improving the detail rendition in color television systems of this type.

In a color television system which accords with the signal specifications proposed by the National Television Systems Committee (NTSC) to the FCC for adoption as color television signal standards, color information is conveyed through the medium of a modulated subcarrier wave. In the proposed system, for color information in a limited low frequency band, the color subcarrier is both phase and amplitude modulated to permit effective three-color reproduction of relatively large picture areas. For color information in a succeeding higher frequency band, the color subcarrier is constant in phase but modulated in amplitude to permit effective two-color reproduction of the relatively small color details of the picture. A broad band monochrome signal is transmitted along with the modulated color subcarrier, the finest picture detail being reproduced in black-and-white only.

In accordance with the constant luminance feature incorporated in the NTSC signal specifications, the broad band monochrome signal is ideally representative only of the luminance variations of the subject. The subcarrier which is modulated with so-called color-difference information ideally carries only chrominance information and has no effect on the luminance of the reproduction. In a perfectly linear system, it is correct to say that the broad band monochrome signal provided for in the signal specifications conveys all the luminance information and that the chrominance signals affect only the chromaticity. However, in a system in which the respective component color signals are made non-linear for gradient correction purposes and the broad band monochrome signal comprises the sum of appropriate portions of these individually corrected component color signals, the chrominance signals do have some effect on the luminance, so that the broad band monochrome signal may no longer be said to convey all the luminance information.

More specifically, the NTSC signal specifications provide that:

$$E_Y = 0.30E_R + 0.59E_G + 0.11E_B$$

where $E_Y$ is the monochrome portion of the color picture signal and $E_R$, $E_G$ and $E_B$ are the gamma-corrected voltages corresponding to the red, green and blue signals intended for the color picture tube. It may thus be noted that the "luminance" signal $E_Y$ is not a gamma-corrected combination of the red, green and blue signals, but rather a combination of the individually gamma-corrected red, green and blue signals. If the transmitted luminance signal $E_Y$ were made up in the former manner rather than the latter, it might more properly be said that the signal represents all of the luminance information throughout the entire range of amplitudes for the luminance and chrominance signals. However, a more complex receiver would be required to obtain the properly related voltages for the steps involving the combining of the luminance information and the color-difference information to obtain the proper simultaneous color signals. Thus, since the signal specifications incorporate the latter manner of formation of the luminance signal, it must be recognized that the chrominance signals do have some effect on the luminance of the color reproduction. It may be demonstrated that the contribution of the chrominance channel to the luminance of the reproduction increases with saturation of the subject colors and therefore is greatest in what may be referred to as high chroma areas of the picture.

While it thus may be readily appreciated that the desirable features of constant luminance operation are not fully realized in high chroma areas, a further problem resides in the fact that detail rendition in high chroma areas is also impaired. To more fully appreciate the reasons for this accompanying result, an examination of the makeup of the chrominance signal should now be made. The chrominance signal comprises the sum of two orthogonal components of a subcarrier wave, respectively modulated by so-called "Q" and "I" color-mixture signals. One component of the color subcarrier of a predetermined phase relative to a reference phase is modulated in amplitude by the narrow band (approximately 500 kc.) $E_Q$ signal, which is equal to $0.41(E_B - E_Y) + 0.48(E_R - E_Y)$; and a second component of the subcarrier in phase quadrature with the first is modulated in amplitude by the moderately wide band (approximately 1.5 mc.) $E_I$ signal, which is equal to $-0.27(E_B - E_Y) + 0.74(E_R - E_Y)$. With the color subcarrier frequency at 3.579545 mc., double sideband transmission, reception and utilization of both color mixture signals, $E_Q$ and $E_I$, up to a 500 kc. limit, is feasible to permit the aforementioned three-color reproduction of relatively large picture areas without crosstalk, while in the band of signals from approximately 500 kc. to 1.5 mc. where inherent system limitations dictate effectively single sideband transmission the single color mixture signal $E_I$ is utilized for the aforementioned two-color reproduction of relatively small color details. However, for the finest picture detail represented by signal frequencies above approximately 1.5 mc. no attempt is made to convey chrominance information, these details being satisfactorily reproduced in black-and-white only in accordance with the well-known mixed highs principle.

Thus, for the finest picture detail the receiving apparatus can utilize only the information supplied by the broad band luminance channel. If the luminance channel truly conveyed all the luminance information as would be readily possible in a linear system, the very fine detail rendition in the color reproduction would be equal to that obtained in conventional black-and-white reproductions. However, as was noted previously, due to the necessity for correcting the respective component color signals for system non-linearities and due to the fact that the luminance signal comprises an appropriately proportioned combination of these individually corrected signals, all the luminance information does not appear in the luminance channel particularly in high chroma areas. A result necessarily is that detail in high chroma regions is deficient in its luminance component, since the narrow-banding of the chrominance channel prevents its contribution of the high frequency luminance information shared thereby to the reproduction.

In the co-pending application of Alfred C. Schroeder, Serial No. 389,566, filed November 2, 1953, and entitled "Color Television," methods and apparatus for correcting this deficiency are disclosed and claimed. Briefly, in accordance with an embodiment of the invention disclosed in the aforesaid application, the high frequency components of the monochrome signal are obtained from a network which continually compares the respective component color signals and selects the component color signal of greatest amplitude as its output. The result is an emphasis of the highs in proportion to chroma in the monochrome signal portion of the composite color picture signal.

The present invention is directed toward an improvement over the methods and apparatus disclosed in the aforesaid Schroeder application.

In accordance with an embodiment of the present invention the high frequency components of the monochrome signal are obtained from a network which continually compares the high frequency components of the respective component color signals and continually selects the component color signal highs of greatest amplitude as its output. Thus, whereas in accordance with the aforesaid Schroeder application selection is of the largest component color signal, in the present invention selection is of the largest component color signal highs. While the formation of the high frequency components of the monochrome signal from the component color signal of greatest ampitude povides satisfactory peaking of highs in proportion to chroma for many image patterns, it may be demonstrated that for certain image patterns more satisfactory peaking may be obtained in accordance with the present invention. As an illustration, it may be appreciated that in a given image portion the red signal channel may continually receive a larger amplitude signal than the blue signal channel, for example, though the high frequency variations of greatest amplitude are occurring in the blue channel. If the color signals are directly compared in amplitude throughout this image portion, the red signal will always be selected as the signal of greatest amplitude even though the greatest high frequency variations occur in the blue signal. On the other hand if only the high frequencies of the respective color signals are compared, as in accordance with the present invention, the large high frequency variations in the blue signal will be selected.

Another factor which contributes to loss of resolution in high chroma areas in reproductions of color television signals in a simultaneous subcarrier type of system is the partial rectification by the reproducing kinescope of subcarrier components reaching the kinescope. It will be readily appreciated that emphasis of the highs in high chroma areas in accordance with the invention serves also to compensate for this additional cause of loss of resolution in such areas. It should also be noted that the improvements in detail rendition which are attributed to use of the present invention are to be observed in black-and-white reproductions of color television signals as well as color reproductions thereof.

Accordingly it is a primary object of the present invention to provide a color television system of the simultaneous subcarrier type with improved apparatus for enhancing detail rendition in color and black-and-white reproductions.

It is a further object of the present invention to provide novel and improved apparatus for forming a luminance signal in a color television system of the simultaneous subcarrier type.

It is an additional object of the present invention to provide a color television system with improved detail rendition in picture areas of highly saturated colors.

It is another object of the present invention to provide novel and improved methods of highs peaking in the luminance channel of a color television system.

Other objects and advantages of the present invention will become readily apparent to those skilled in the art upon a reading of the following description and an inspection of the accompanying drawings in which:

Figure 1 illustrates in block and schematic form a color television transmitting system in which the monochrome portion of a composite color picture signal is formed in accordance with an embodiment of the present invention.

Figure 2A:
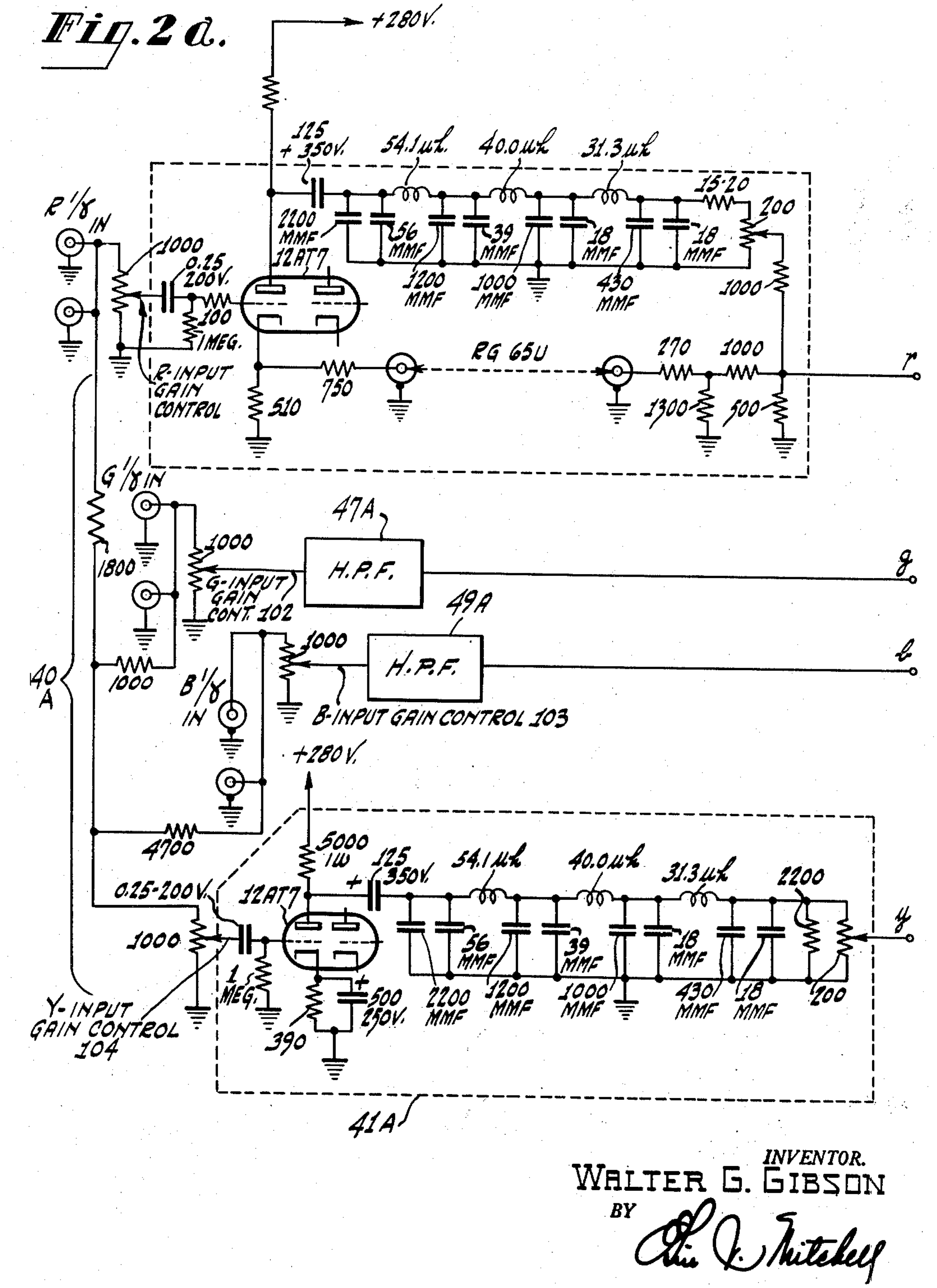
Figure 2B:
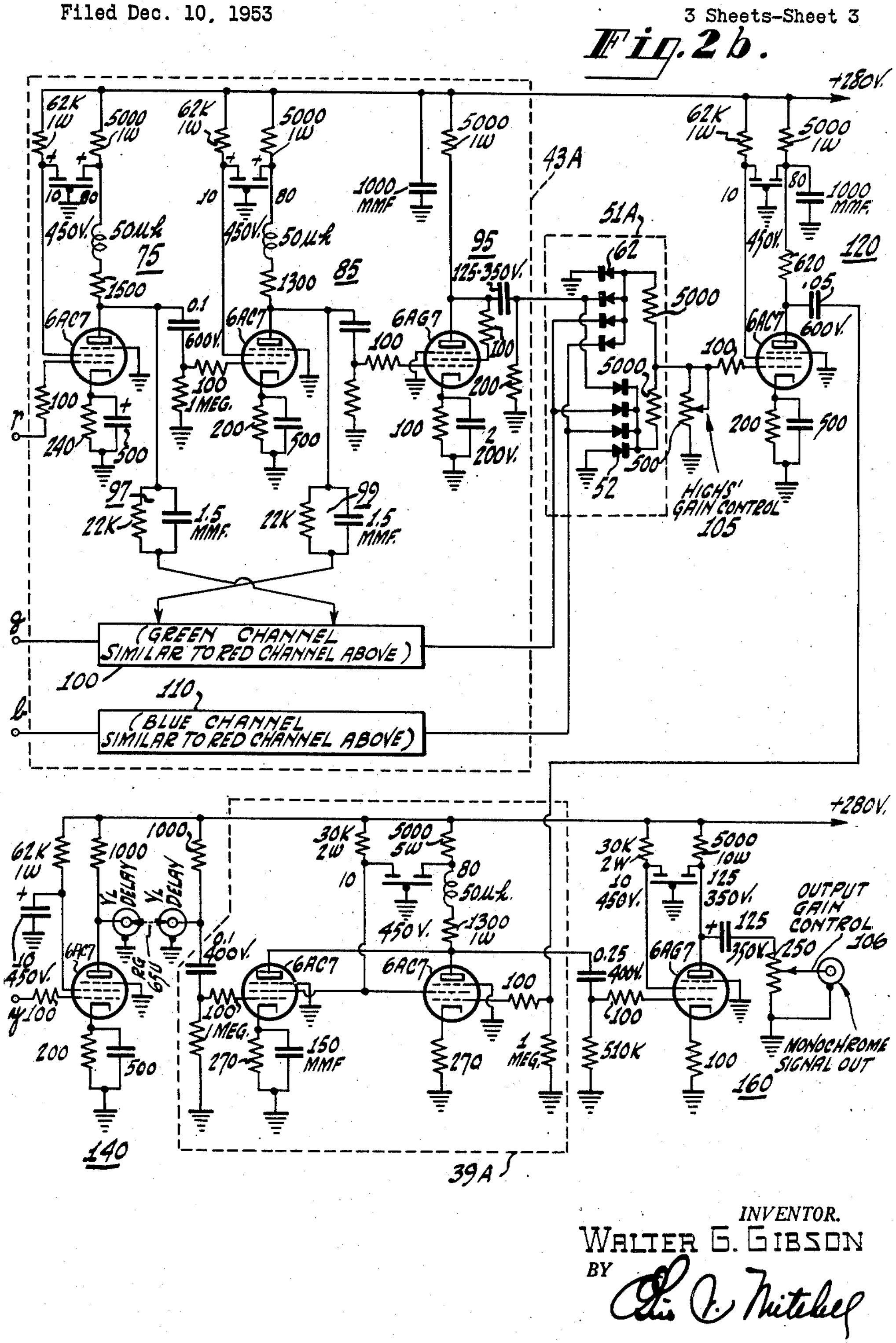

Figures 2*a* and 2*b* illustrate, in a more detailed essentially schematic presentation, the monochrome signal forming apparatus of such a color television transmitting system incorporating a somewhat modified version of the embodiment of the invention shown in Figure 1.

Referring to this figure in greater detail, a camera 11 is illustrated as the source of three simultaneous component color signals $E_R$, $E_G$ and $E_B$. The individual component color signals are applied to respective gradient correction amplifiers or so-called gamma-correction amplifiers 13, 15 and 17. The respective output signals $$E_R\frac{1}{\gamma},\ E_G\frac{1}{\gamma},\ \text{and}\ E_B\frac{1}{\gamma}$$

are representative of the original component color signals after introduction of a compensatory non-linearity, which in conjunction with camera non-linearity provides what is essentially the complement of the ultimate image reproducer's non-linearity.

As in color television systems of the type described in the article "Principles and development of color television systems" by G. H. Brown and D. G. C. Luck, appearing in the June 1953 issue of the RCA Review, the individually gamma-corrected color signals may be applied to suitable matrixing circuits 19, wherein the respective color signals may be combined in appropriate proportions and suitable polarities to obtain the desired color mixture signal outputs. In a color television system of the type disclosed in the aforementioned article and which is in accordance with the aforementioned NTSC signal specifications, the color mixture signal outputs may comprise so-called "Q" and "I" signals of the following character:

$$E_Q=0.21E_R\frac{1}{\gamma}-0.52E_G\frac{1}{\gamma}+0.31E_B\frac{1}{\gamma}$$

and $$E_I=0.60E_R\frac{1}{\gamma}-0.28E_G\frac{1}{\gamma}-0.32E_B\frac{1}{\gamma}$$

In further accordance with such proposed systems the Q and I signals may be passed through respective low pass filters 21 and 23 having passbands of 0 to 0.5 mc. and 0 to 1.5 mc. respectively, and applied to respective subcarrier modulators 25 and 27. The Q signal modulates waves of subcarrier frequency supplied by the subcarrier source 29 having a predetermined phase relationship relative to some reference phase, while the I signal modulates waves of subcarrier frequency from source 29 which are in phase quadrature with those subject to the Q signal. Respective bandpass filters 31 and 33 are provided to select from the modulation products of the respective modulators 25 and 27, a narrow band, double sideband signal lying in the 3 to 4.2 mc. band, and a wider band, partially single sideband signal lying in the 2 to 4.2 mc. band.

A sync signal generator 35 is conventionally provided to synchronously control the generation of scanning waves for the camera 11 in the camera deflection wave generators 37. The sync signal generator 35 is tied to the subcarrier source 29 to insure that the desired relationship between scanning and subcarrier frequencies is maintained, which tie-in relationship is generally provided by deriving the scanning synchronization signals from the subcarrier source output by suitable frequency division.

An adder 39 is provided for combining the Q and I modulated subcarrier waves and the appropriate synchronizing signals derived from the sync generator 35 and subcarrier source 29 with a broad band monochrome signal. The formation of a monochrome signal for combination with the aforementioned signals in a color television system of the type described is the particular subject of the present invention and will now be described in detail.

In addition to application of the individually gamma-corrected color signals to matrixing circuits 19 for formation of the Q and I color mixture signals, the individually gamma-corrected color signals are also applied to additional matrixing circuits 40 for combination thereof to obtain a so-called luminance signal $E_Y$, nominally representative of the luminance of the subject image elements. In accordance with the aforementioned NTSC signal specification and with the constant luminance feature incorporated therein, the component color signals are combined in proportion to the relative luminosities of the respective primaries, i. e.

$$E_Y=0.30E_R\frac{1}{\gamma}+0.59E_G\frac{1}{\gamma}+0.11E_B\frac{1}{\gamma}$$

It has heretofore been general practice to utilize a signal so proportioned as the entire broad band monochrome portion of the composite transmitted color picture signal. Thus the output of matrixing circuits 40 would normally be passed through a low pass filter having a passband of 0 to approximately 4.2 mc. and combined with the other signal components in adder 39. However in accordance with the present invention, whereby as previously indicated it is desired to compensate for detail loss in high chroma areas of the picture, a Y signal so proportioned is utilized only as the low frequency component of the transmitted monochrome signal. Thus the low pass filter 41 having a passband of 0 to 1.5 mc. is provided in the Y signal path between matrixing circuits 40 and adder 39, so that the luminosity-function proportioning of the monochrome signal makeup applies only in the range of frequencies occupied by one or both of the I and Q signals. The high frequency component of the monochrome signal is separately formed in a novel manner.

In accordance with the illustrated embodiment, a third matrixing network 43 is provided for the individually gamma-corrected color signals in addition to the previously discussed matrixing circuits 19 and 40. The matrixing circuits 43 are included to provide a plurality of output signals, representative of equal proportions of the respective component color signals, or different proportions thereof, or representative of predetermined mixtures thereof, which output signals may be applied via high pass filters 45, 47 and 49 to a signal comparison network 51 for comparison in amplitude and selection of the respective signal highs of greatest amplitude in accordance with the principles of the invention to be subsequently discussed. Desirable improvements in detail rendition have been achieved in accordance with the invention where the signals applied to the filters 45, 47, 49 were respectively representative of the three individually corrected component color signals, without different relative adjustments in gain therefor and without mixing of portions thereof. In such instances, the so-called matrixing circuits 43 need perform no matrixing function but may serve only to provide equal gain amplifiers for the respective component color signals, or may even be omitted. However, it appears desirable to include such apparatus as the matrixing circuits 43 in the coupling of the component color signals to the comparison network 45, so that should image conditions, system limitations or other circumstances so indicate, relative adjustments of the respective component color signal gains or actual matrixing of the component color signals to provide predetermined color mixture signals may be achieved to avoid excessive detail-loss compensation or insufficient detail-loss compensation for particular color changes or under particular brightness conditions. For the purposes of the following description, however, whereby one may most readily arrive at an understanding of the principles of the invention, it will be assumed that the matrixing circuits 43 supply the high pass filters 45, 47, 49 with three respective signals substantially corresponding to the individually corrected component color signals without different relative gain adjustments and without matrix formation of mixture signals.

In accordance with the invention the respective color signal outputs of the matrixing circuits 43 are applied via the respective high pass filters 45, 47 and 49 to the signal comparison network 51. The passbands of the similar filters 45, 47 and 49 may be approximately 1.5 to 4.2 mc., encompassing the high frequency portion of the normal monochrome signal frequency band not included in the passband of the low pass filter 41 previously discussed.

The network 51, in which the high frequency components of the respective signals are compared in amplitude to obtain an output signal continually representative of the greatest amplitude high frequency components, as illustrated functions quite similarly to the maximum amplitude selecting network shown in the aforesaid Schroeder application (and the minimum amplitude selecting network shown in Schroeder's U. S. Patent No. 2,646,463, filed July 18, 1951 and entitled "Apparatus for Reproducing Images in Color") with several notable differences due to the different characteristics of the input signals. Whereas in the aforesaid Schroeder application embodiment, level setters were included for each input signal for restoring D.-C. or low frequency components, there is no need for D.-C. restoration in the network 51 of the present invention since D.-C. and low frequency components of the respective signals have been purposely removed therefrom. Also, whereas in the aforesaid Schroeder application the selecting network required only one set of diodes of one polarization tied in common to a single output terminal, the present invention requires two such diode sets of respectively opposite polarization. The reason for this is readily apparent when it is appreciated that the respective input signals herein, lacking D.-C. and low frequency components, are purely A.-C. waves, and respective diode sets must be provided to separately select the maximum negative swings as well as the maximum positive swings among the three signals being compared.

Thus the respective color signal outputs of the filters 45, 47 and 49 are applied to the plates of the diodes 53, 55 and 57, respectively, as well as to the cathodes of the diodes 63, 65 and 67, respectively. The cathodes of the diodes 53, 55 and 57 are tied together and connected to a point of reference potential via a common output resistor 59. Forward bias is applied to the cathodes of these three diodes in common from a source of relatively negative variable potential via a resistor 58. A first output terminal 60 is provided at an adjustably tapped point on the output resistor 59. Similarly the plates of the diodes 63, 65 and 67 are tied together, coupled to a point of reference potential via a common output resistor 69, and supplied with forward bias in common from a source of relatively positive variable potential via resistor 68. A second output terminal 70 is provided at an adjustably tapped point on output resistor 69.

While operation of the diode sets to effect maximum amplitude selection is explained in detail in the aforesaid Schroeder application and patent, for a brief explanation it may be sufficient to note as follows. During swings in the positive direction in the respective color signal inputs to the network 51, if one color signal is greater than the others the potential applied to the plate of the corresponding diode in the diode set 53, 55, 57 becomes more positive. The diode to which the color signal of greatest swing in positive direction is applied conducts the most and the potential of all the diode cathodes rises to a value just below that of the largest color signal. This latter value is greater than the other color signals and therefore the other color signals cannot pass to common output terminal 60. Similarly the diode set 63, 65, 67 operates to pass to the common output terminal 70 only the color signal having the maximum negative swings.

The output terminals 60 and 70 of the selecting network 51 are coupled to the adder 39 so that the signals appearing at these two output terminals may be combined together with the low frequency portion of the monochrome signal passed by filter 41, the modulated subcarrier signals passed by filters 31 and 33 and the synchronizing information supplied by generator 35 and subcarrier source 29. It will be appreciated that the combination of the signals appearing at terminals 60 and 70 in the adder 39 provides a monochrome signal high frequency portion continually representative of the respective color signal highs that are greatest at any instant. The result is that, in high chroma areas where the amplitude of the high of one color signal may be substantially greater than the amplitude of the highs of one or both of the other color signals, the combination of the outputs at terminals 60 and 70 corresponds to the dominant color signal highs rather than corresponding to a mixture of the highs of the three signals. The full monochrome signal formed in accordance with the present invention thus comprises a low frequency portion which is the luminosity-function mixture of the color signals desired for constant luminance operation, and a high frequency portion which corresponds as previously indicated to the color signal highs of greatest amplitude.

It may be readily demonstrated that the result of practicing the present invention is an effective peaking of the highs in the monochrome signal in proportion to chroma to make up for the loss of high frequency luminance information in the chrominance channel. In highly saturated color areas of the picture substantial peaking of the highs occurs to compensate for substantial loss of high frequency luminance information, the output of the network 51 being substantially emphasized in contrast to the highs output otherwise obtained from the luminosity-function proportioning matrix 40. However, it may be noted that in white or gray image areas where the respective component color signals are ideally equal, the highs output of the network 51 will be essentially the same as the highs output of the matrix 40. Use of the present invention thus involves no change in the appearance of the monochrome signal for white or gray image areas. Since, however, there is no loss of luminance information in the chrominance channel for white or gray image areas, the absence of effective peaking of the highs for white or gray signals is a desired result of the use of the invention. Also, it may be noted that in colored areas of low saturation, where the respective component color signals are nearly equal, the "maximum" highs selected by network 51 will be only slightly greater in amplitude than the "mixture" highs which would otherwise be selected from the output of the matrix 40. Thus, the degree of effective peaking of the highs in the monochrome signal formed in accordance with the invention is observed to be proportional to saturation of the image colors, which is the desired result, since the deficiency of luminance information in the monochrome signal for which it is desired to compensate is proportional to saturation.

A further practical advantage of the present invention may often be realized when utilized in a simultaneous pickup system involving the use of a three-tube pickup device, as is more or less conventional in the art at present. Where such a pickup device is used, one tube may have better resolution than the others. In such a case the ideal signal conditions for white or gray images mentioned in the explanation above will no longer exist, i. e. the respective color signal highs will no longer be identical for white. In this situation, use of the invention will result in selection of highs from the "sharpest" tube, with a resultant higher resolution reproduction of white or gray image areas than would be obtained in systems using conventional formation of the monochrome signal.

Referring now to Figures 2*a* and 2*b*, schematic details of a working embodiment of the present invention are shown. While the general arrangement and principles of operation of the monochrome signal forming apparatus of Figures 2*a* and 2*b* are similar to those discussed with respect to Figure 1, there are some changes in arrangement, and modifications or additions in apparatus, which shall be pointed out in the following discussion. It may be noted that the matrixing circuits 43, high pass filters 45, 47 and 49, maximum amplitude selecting network 51, matrixing circuits 40, low pass filter 41, and adder 39, of the monochrome signal forming apparatus shown in Figure 1 have as counterparts in Figures 2*a* and 2*b*, the matrixing circuits 43A, high pass filters 45A, 47A and 49A, selecting network 51A, matrixing circuit 40A, low pass filter 41A and adder 39A. The differences in the showing in the latter figures may be noted as including: the arrangement of matrixing circuits 43A to follow the high pass filters rather than precede them; the specific showing of gain controls, such as input gain control potentiometers 101, 102, 103 and 104, highs gain control potentiometer 105, and output gain control potentiometer 106; the modification of the selecting network 51A to include additional diodes 52 and 62; the separation of adding operations to provide for combining of the selected positive and negative swings in the selecting network 51A and combining of the monochrome highs and low signals in adder 39A, with the postponement of combination with chrominane and synchronizing signals to some subsequent adding stage (not shown); and the inclusion of respective monochrome highs, lows, and output amplifying stages 120, 140 and 160.

As shown in Figure 2*a*, the input signals to the illustrated system portion are in the form of $$E_{R}\frac{1}{\gamma},\ E_{G}\frac{1}{\gamma} \text{ and } E_{B}\frac{1}{\gamma}$$

Thus it may be assumed that these input signals have been obtained from suitable gamma-correction amplifiers such as discussed in connection with Figure 1. The gamma-corrected color signals are applied to respective high pass filters 45A, 47A and 49A via respective input gain control potentiometers 101, 102 and 103. Filter 45A has been shown in schematic detail and is of the general type utilizing a low pass filter and a delay line, an example of which is shown in U. S. Patent 2,651,673, Fredendall, issued on September 8, 1953. The details of high pass filters 47A and 49A may be substantially identical with those shown for the red signal high pass filter 45. The outputs of the respective high pass filters are applied to respective channels of a matrixing network 43A.

As previously noted, a difference between the arrangement of Figure 1 and the arrangements illustrated by Figures 2*a* and 2*b* is that in the latter the matrixing circuits 43A follow the high pass filters rather than precede them. It will be readily appreciated that the results are substantially equivalent whichever order is followed. That is, to obtain suitable input signals for comparison in the maximum amplitude selecting network, either the high frequency components of the respective color signals may first be separated out and then matrixed as desired, or the respective component color signals may be first matrixed and then the high frequency components of the respective matrix output signals may be separated out.

The three-stage red channel of the matrixing circuits 43A is illustrated in schematic detail, while the green and blue channels, which may be substantially similar to the red channel, are illustrated in block form only. In the particular embodiment of the present invention illustrated by Figures 2*a* and 2*b* cross mixing of signals in the red and green channels is effected in the matrixing network 43A, via cross-couplings 97 and 99 between the respective second stage outputs and second stage inputs of the red and green channel, but no cross mixing with the blue channel is effected.

The respective channel outputs of the matrixing network 43A are applied to the maximum amplitude selecting network 51A, the details of which differ in some respects from those shown for network 51 in Figure 1. In particular, in the positive peak selecting diode set an additional fourth diode 52 is shown having its cathode tied to the common cathode terminal of the others and having its anode connected directly to ground. A comparably connected additional diode 62 is also provided for the negative peak selecting diode set. These additional diodes are provided to prevent diminution of selected maximum signals by signals of opposite polarity which may be capacitively coupled across the diodes of the particular set. Thus for example diode 52 effectively shorts out negative signal swings which may be capacitively coupled across the diodes of the maximum positive swing selecting diode set, while diode 62 effectively shorts out positive signal swings which may be capacitively coupled across the diodes of the maximum negative swing selecting diode set.

The selected positive and negative signal swings are directly combined in the network 51*a*, and applied via a gain control potentiometer 105 to an amplifying stage 120. The output of this amplifying stage is then utilized as one of the inputs to a vacuum tube type adder circuit 39*a*. The other input to the adder 39*a* comprises the low frequency portion of the desired monochrome signal, and is derived from the gamma-corrected component color signals in a manner similar to that shown in Figure 1. The luminosity-function proportioning matrixing is effected by the resistive matrix 40*a* as illustrated in Figure 2*a*. The mixture signal is applied via a Y-input gain control potentiometer 104 to a low pass filter 41*a* which is similar to the low pass network component of the illustrated high pass filters 45*a*, 47*a* and 49*a*. The low frequency output of the filter 41*a* is applied by means of an amplifying stage 140, incorporating in its output circuit a delay line intended to match the delay imparted to the separately formed "highs" signal, to the adder 39*a*. The monochrome signal output formed in accordance with the invention is derived from an output gain control potentiometer 106, in the output circuit of an amplifying stage 160 coupled to the adder 39*a*, and is available for suitable combination with chrominance and synchronizing signals to form a composite color picture signal.

A specific example of color signals other than unmodified component color signals which may be utilized for application to the diode selection network with highly desirable results are signals of the following approximate relationship: 1.0R—.5G; 1.0G—.5R; and .3B. Signals substantially of such character were utilized in the working embodiment illustrated by Figures 2*a* and 2*b*, with the red-green mixing being effected via the cross-couplings 97 and 99 in the matrixing network 43A, and with the relative attenuation of the blue signals being conveniently effected via appropriate setting of the blue input gain control potentiometer 103 relative to the settings of the red and green input gain control potentiometers 101 and 102.

With respect to the high pass filters and low pass filter utilized in the monochrome signal forming apparatus of the invention, it may be noted that these filters are preferably phase corrected or linearized to avoid introduction of undersirable phase distortions. With respect to the frequency response characteristics of these filters, it should be noted that they need not be sharp cut-off filters. For example, the high pass filters 45A, 47A and 49A and the low pass filter 41A of the working embodiment illustrated in Figures 2*a* and 2*b* are each provided with a cut-off "skirt" of a relatively gradual slope, the 50% voltage response point of each being located at about 750 kc.

Such gradual cut-off characteristics are desirable from the point of view of ease of phase correction, and are also preferable in a system in accordance with the aforementioned NTSC signal specifications for a further reason which may be appreciated from the following discussion. First, it may be stated that in a system where all the chrominance signals are of equal bandwidth, a sharp cut-off for the filters in question at the chrominance signal limiting frequency is appropriate. However, in a system which in accordance with the aforementioned NTSC signal specifications is provided with a pair of chrominance signals of unequal bandwidth, choice of a sharp cut-off for the filters at either the limiting frequency for the narrow band chrominance signal or at the limiting frequency of the wider band chrominance signal causes an undesirable result: i. e., over-compensation—excessive peaking—for signals intermediate the two limiting frequencies, with choice of the former; undercompensation—absence of peaking where some is necessary—for such intermediate signals, with choice of the latter. Thus, it may be seen that the use of gradual cut-off high pass and low pass filters with a cross-over between the respective characteristics in the range intermediate the "I" and "Q" signal frequency limits, as indicated above, permits a compromise achievement of substantially correct compensation for information loss in the intermediate single-chrominance signal range under the NTSC signal specifications.

In Figures 2*a* and 2*b* various values of resistance, capacity, inductance and voltage, as well as specific tube types, have been designated for the illustrated elements, since apparatus employing elements of such values has been found to provide satisfactory operation. However, it should not be assumed that these values are in any way critical and it will be appreciated that details and specific values in Figures 2*a* and 2*b* are given by way of example only and are not intended to restrict in any way the scope of the present invention. The resistance and capacity values indicated in Figures 2*a* and 2*b* are in ohms and microfarads, respectively, unless otherwise specified in the drawings.

It should also be appreciated that, while in the illustrated embodiments of the invention the signals applied to the maximum amplitude selecting network were in the form of gamma-corrected component color signals or appropriate mixtures thereof, other embodiments utilizing the component color signals as originally derived (i. e. before gamma-correction) or approximate mixtures thereof for application to the maximum amplitude selecting network are also contemplated to be within the scope of the present invention.

Having described my invention, what is claimed is:

1. In a color television system provided with a plurality of component color signals and a signal nominally representative of luminance, apparatus including the combination of a signal path for each of said component color signals, each of said signal paths including a high pass filter, a maximum amplitude selecting network, the outputs of all of said signal paths being applied to said network, and means for adding the selective output of said network to a low frequency portion of said signal nominally representative of luminance, said selecting network having an output circuit to which said adding means is coupled and said selecting network comprising means for comparing in amplitude all of said signal path outputs to selectively pass to said output circuit the signal path output of greatest amplitude.

2. Apparatus in accordance with claim 1 wherein cross couplings are provided between at least two of said signal paths.

3. Apparatus in accordance with claim 1 wherein said signal amplitude comparing means includes a first set of diodes and a second set of diodes, all of the cathodes of said first set of diodes being connected together and all of the anodes of said second set of diodes being connected together, each of said signal paths being coupled to a respectively different one of the anodes of said first set of diodes and to a respectively different one of the cathodes of said second set of diodes.

4. In a color television system provided with a plurality of simultaneous component color signals, apparatus including the combination of means for combining all of said component color signals in relative proportions substantially corresponding to the relative luminosities of said component colors, a low pass filter coupled to said component color signal combining means, a plurality of signal paths each including a high pass filter, means for applying each of said component color signals to a respectively different one of said plurality of signal paths, signal comparison means coupled to said signal paths for providing an output signal continually representative of the signal path output of greatest magnitude, and signal adding means coupled to said low pass filter and to said signal comparison means.

5. In a color television system of the simultaneous sub-carrier type including means for developing a plurality of simultaneous component color signals, apparatus for developing a broad band monochrome signal including the combination of means for matrixing said plurality of component color signals to provide a mixture signal, additional means for matrixing said plurality of component color signals to provide a plurality of color signal outputs, a plurality of high pass filters coupled to said additional matrixing means, each of said high pass filters adapted to pass the high frequency portion of a respective one of said plurality of color signal outputs, means for selecting the color signal high frequency portion of greatest amplitude, and means for adding said selected color signal high frequency portion to said mixture signal to form said broad band monochrome signal, said selecting means having an output circuit to which said adding means is coupled and said selecting means comprising means responsive to the high pass filter output of greatest amplitude for selectively blocking the passage to said output circuit of all of said high pass filter outputs of lesser amplitude than said greatest amplitude.

6. In a color television system of the simultaneous sub-carrier type, the method of forming a broad band monochrome signal which comprises the steps of combining a plurality of color signals in relative proportions substantially corresponding to the relative luminosities of the colors, simultaneously comparing high frequency portions of a plurality of color signals and selecting the color signal high frequency portion of greatest amplitude, and combining a low frequency portion of said combined color signals with said selected color signal high frequency portion.

7. In a color television system including a source of a plurality of simultaneous component color signals, apparatus including the combination of matrixing means effectively coupled to said source for providing a signal nominally representative of luminance, additional means effectively coupled to said source for deriving a plurality of color representative signals from said simultaneous component color signals, signal comparison means responsive to similarly frequency-limited high frequency portions of said plurality of color representative signals for providing a selective output signal corresponding to the color representative signal high frequency portion of greatest magnitude, and means for adding said selective output signal to a low frequency portion of said signal nominally representative of luminance.

8. In a color television system of the simultaneous sub-carrier type wherein the transmitted composite color picture signal includes a broad band monochrome signal, said system including a source of a plurality of simultaneous component color signals, the combination comprising a matrixing circuit coupled to said source for combining all of said component color signals in relative proportions substantially corresponding to the relative luminosities of said component colors to form a signal nominally representative of the luminance of the subject image, a signal path for each of said component color signals, each said signal path including a high pass filter, signal comparison means, said signal paths being coupled between said source and said signal comparison means, said signal comparison means including means for selecting the maximum positive signal swings among the outputs of all said signal paths and means for selecting the maximum negative signal swings among the outputs of all said signal paths, a low pass filter having a passband substantially encompassing a low frequency portion of said broad band not included in the passbands of said high pass filters, and adding means effectively coupled to the outputs of said pair of maximum swing selecting means and to the output of said matrixing circuit, the coupling between said matrixing circuit and said adding means including said low pass filter.

9. A combination in accordance with claim 8 wherein means are provided for applying a portion of the signal appearing in one of said signal paths to another of said signal paths.

References Cited in the file of this patent

UNITED STATES PATENTS

| | | |
|---|---|---|
| 2,646,463 | Schroeder | July 21, 1953 |
| 2,651,673 | Fredendall | Sept. 8, 1953 |
| 2,691,696 | Yule | Oct. 12, 1954 |